United States Patent

[11] 3,607,528

[72] Inventor James S. Gassaway
Los Angeles, Calif.
[21] Appl. No. 704,031
[22] Filed Feb. 8, 1968
[45] Patented Sept. 21, 1971

[54] MAGNETIC MEMORY MEMBERS AND METHODS OF MAKING THE SAME
31 Claims, 13 Drawing Figs.

[52] U.S. Cl. .......... 156/230, 117/230, 156/232, 156/245, 156/247, 156/289, 156/295, 179/100.2 A, 252/62.54, 264/104, 274/41.4
[51] Int. Cl. .......... B44d 1/34, B44d 1/40
[50] Field of Search .......... 156/230, 245, 289, 295; 179/100.2 A; 252/62.54; 264/104; 274/41.4

[56] References Cited

UNITED STATES PATENTS

| | | | |
|---|---|---|---|
| 2,862,845 | 12/1958 | Szegvari | 179/100.2 A X |
| 3,040,386 | 6/1962 | Lockwood et al. | 252/62.54 X |
| 3,109,749 | 11/1963 | Di Ricco | 117/72 |
| 3,417,389 | 12/1968 | Dike | 179/100.2 A X |
| 3,466,156 | 9/1969 | Peters et al. | 29/195 |
| 3,470,021 | 9/1969 | Hendrick et al. | 252/62.54 X |

FOREIGN PATENTS

| | | | |
|---|---|---|---|
| 1,059,416 | 2/1967 | Great Britain | 156/230 |
| 527,905 | 7/1956 | Canada | 252/62.54 |
| 720,477 | 10/1965 | Canada | 252/62.54 |

*Primary Examiner*—Leland A. Sebastian
*Attorney*—Bernard Kriegel

ABSTRACT: A magnetic memory member produced by providing a master member of glass, or the like, having a predetermined finished surface to which a very thin silver or other parting agent may be applied, a magnetic coating of a desired thickness being applied to the parting agent, which coating may, for example, be magnetic particles in a binder or magnetic material plated directly on the parting agent, the magnetic coating assuming the same surface condition as the master member. A substrate is secured to the magnetic coating, the parting agent released from the master member and the parting agent removed from the coating. Where the magnetic coating includes a binder with magnetic particles therewithin, the magnetic memory member so produced has a dense film of magnetic particles concentrated at the outer surface of the coating for subsequent coaction with a recording or reproducing head.

INVENTOR.
JAMES S. GASSAWAY
BY Bernard Kriegel
ATTORNEY.

INVENTOR.
JAMES S. GASSAWAY
By Bernard Kriegel
ATTORNEY.

INVENTOR
JAMES S. GASSAWAY
BY Bernard Kriegel
ATTORNEY.

MAGNETIC MEMORY MEMBERS AND METHODS OF MAKING THE SAME

The present invention relates to magnetic memory devices for electronic computers and to methods of making the same, and more particularly to magnetic memory discs and methods of making the same.

Heretofore, magnetic memory discs for storing and reproducing electrical signals have been difficult to produce to the required specifications. Magnetic particles, such as magnetic iron oxide, dispersed in a binder material, such as an epoxy resin, are applied to the surface of a disc to form a coating thereon by spraying, spin coating, doctor blades, silk screening, roller coating, and the like. In lieu of magnetic oxides, magnetic metals, such as nickel and cobalt, have been vapor deposited on the disc. The control of the coating smoothness, flatness, thickness and parallelity of the disc faces, under the above methods of coating application, are dependent upon three main operations. The disc and its surface must be prepared to a smoothness, flatness, thickness and parallelism approaching the finish desired on the final coated surface. When magnetic iron oxide is used in a binder material, a controlled amount of the magnetic dispersion must be accurately applied to the disc, preferably in a clean atmosphere to prevent surface contamination, the dispersion being cured to a useable hardness. The surface has been lapped and polished to the desired flatness, thickness of magnetic coating, smoothness, parallelism, and overall thickness. When magnetic metals are plated on the disc substrate, undesired pimples or high spots rise up on the recording and reproducing surface.

Machining, grinding, lapping and polishing the disc substrate to the desired smoothness preparatory to application of the coating are very costly. It has been necessary to secure the desired smoothness and flatness of the disc, since the coating conforms to a high degree to the disc surface, particularly when it is considered that the coatings have been applied to thicknesses which, in the present state of the art, seldom, if ever, exceed 0.0003 inches and usually average 0.0002 inches. A relatively shallow scratch on the disc surface preparatory to the application of the coating, which, for example, may be of the order of 0.0005 inches in depth, might well result in the scrapping of the final coated disc. In the example of the scratch given above, the smooth flowing of the coating over the scratch would result in the thickness of the coating varying from about 0.0002 inches to 0.0007 inches, and would render the finished disc useless for very high bits per inch recording. The current standard for discs in the computer art calls for a maximum coating thickness of 0.00025 inches and a smoothness variation not to exceed 0.000003 inches arithmetic average. With such requirements, the slightest contamination on the surface of the uncoated disc, or on the surface of the coating itself, renders the finished disc outside the tolerance limits. Perils of contamination have been minimized by performing all coating and curing operations in a clean room. The coated disc itself is polished after the curing operation in a clean room.

The final lapping and polishing on the coated disc frequently produce scratches that require scrapping of the disc. The thickness of the coating on the disc is so small that it is usually impossible to polish out scratches without exceeding the tolerances and permissible variations of the coating thickness.

At present, the dispersion of the magnetic particles in the binder, often referred to as "mud," is applied to the surface of the disc, with the magnetic particles forming a large percentage of the mix, in order to produce the densest magnetic coating possible. These "muds" tend strongly to drop the magnetic solid particles out of the dispersion, resulting in a concentration of the solids near the surface of the inner face of the coating adjacent the disc or substrate, a disproportionate amount of the binder being disposed at the interface of the coating and the air. In other words, there is a higher density of the magnetic particles disposed inwardly of the exposed face of the coating and a relatively low density of particles at the outer face itself, there being an unwanted binder material, such as the epoxy resin, at the outer face, which increases the gap between the read-write head, decreasing the signal level and the bits per inch potential. Final lapping and polishing operations remove, or at least diminish, the thickness of the unwanted epoxy or other binder material to some degree.

The nature of the direct coating processes on the disc produces surfaces which seldom, if ever, fall within the smoothness requirements of the computer industry. This appears to be caused by the fact that the coatings are heavily laden with solids, and they are so thin that natural levelling phenomena, such as gravity, cohesion, surface tension, and the like, are ineffectual to the required degree for producing an adequate surface finishing. This results in the use of lapping and polishing operations as direct measures to achieve the desired finish on the coated disc.

Many of the substrate materials, and the conditions in which the discs are intended to operate, require applying an anticorrosive treatment to the substrate (disc) prior to application of the "mud" or magnetic plating. The necessity of this operation adds to the cost of manufacture of the finished disc.

The present invention overcomes the necessity for costly machining, grinding, lapping and polishing of the disc, or other substrate, and yet results in the production of a magnetic memory member that is far superior to the prior art devices. Despite the fact that the disc surface may not have the desired smoothness, the finished coating (mud or plating) will still have the desired smooth surface, and with a high density of magnetic particles, in the case of a mud coating, at the outer surface of the finally coated disc, leaving virtually no gaps between the particles in the exposed surface of the disc to which the recording or reproducing head is to be applied. No final lapping or polishing operation at all is necessary to produce the finished outer surface on the coating which has been applied to the substrate. The method employed inherently produces thinner and denser magnetic portions of the coating, which, as has been stated above, is disposed at the outer surface of the coating, rather than at the inner surface.

In general, the method of making the memory member includes the provision of a master having a surface of the desired smoothness. In the specific application of the invention to the production of magnetic memory discs, a flat master member, such as glass, is used having an optically flat surface finished to a flatness and smoothness equal or better than the flatness and smoothness required of the magnetic coating of the end product, namely, the magnetic recording and reproducing disc. The optically flat and smooth surface of the master member then has a release or parting agent applied thereto, which need only be several molecules in thickness, so long as it has adequate mechanical strength, and, in effect, also presents an optically flat and smooth surface. As an example, a vapor-deposited film of silver, a few molecules thick (250 to 500 Angstrom units), is adequate to protect the master member during the subsequent operations in producing the magnetic memory disc, and such film will not be adversely affected by the "mud" or plating subsequently applied thereto. Its very minimal thickness is sufficient to insure the absence of permanent adherence of the " mud" or plated magnetic film to the master member.

If the magnetic coating is "mud" of a dispersion of the magnetic particles in the binder, such as an epoxy resin, it is then applied to the surface of the release agent in any suitable manner and to the desired thickness. Since the "mud" is applied with the parting agent facing upwardly, the magnetic particles, being of much greater density than the binder, will shift to the bottom side of the dispersion, and thereby be concentrated adjacent to the parting surface. After sufficient time has elapsed for the particles to gravitate, or to be otherwise shifted, to the positioning against the parting agent, the assembly is at least partially cured by applying heat thereto of the required degree, the coating being chemically hardened and its shape thus stabilized. With a plated coating, the magnetic film is plated against the surface of the master member or against the release or parting agent.

A secondary binder is then applied to the exposed surface of the coating and appropriately spread over the surface of the latter. The substrate or disc is then placed against the secondary coating and heat applied to finish cure the initial coating, if necessary, to cure the secondary binder and to permanently adhere the initial coating to the secondary coating or binder, which, in turn, is also adhered by this operation to the substrate or disc. If a plated coating is used, the application of heat will, of course, cure the secondary binder, since curing of the plated coating is not involved.

The result is a structure in which the substrate is tightly bonded to the secondary binder, which, in turn, is tightly bonded to the magnetic coating, the latter being tightly bonded to the parting agent, which, in turn, is loosely bonded to the master member. Upon cooling the combination, the relatively strong substrate, which may, for example, be an aluminum disc, and the master member, both shrink in proportion to their coefficients of thermal expansion, and the resulting internal stresses cause the sandwich to be separated between the parting agent and the master member.

Since it is not customary for recording and reproducing members to have coatings of metal over iron oxide epoxy surfaces, or plated or deposited on nickel cobalt or other magnetic films, which are specific materials comprising the first coating, the parting agent is removed. Assuming the parting agent to be silver, the recording and reproducing member of disc is dipped into a dilute acid for a few seconds and rinsed in water. The parting agent need not necessarily be removed, but may be removed, if desired, since the retention and presence of a metallic parting agent on the surface of the magnetic coating may be of value, as, for example, as protection to the recorded information against physical contact by recording or reproducing heads with the magnetic surface.

The memory disc is in its finished form. No grinding, lapping or polishing operations are necessary since the surface of the disc is flat and smooth, having essentially the same flatness and smoothness as the surface of the master member. Any defects or variations in the surface of the substrate do not adversely affect the exposed coated surface, since the secondary binder will fill imperfections, if any, in the substrate surface, without, in any manner, affecting the condition of the exposed surface of the magnetic coating. Thus, it is unnecessary to preliminarily polish and lap the substrate member, since the surface of the magnetic coating is independent of the surface of condition of the substrate. It is the condition of the master surface that dictates the condition of the exposed surface of the magnetic coating. In addition, as has been pointed out above, there is a concentration of magnetic particles, when iron oxide coatings are used, at the exposed surface of the magnetic coating, eliminating gaps existing in prior discs and insuring more effective storage of information on the coated surface and reproduction of such information therefrom.

This invention possesses many other advantages and has other purposes which may be made more clearly apparent from a consideration of several forms and methods embodying the invention. These forms and methods are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawing.

Figure 1:
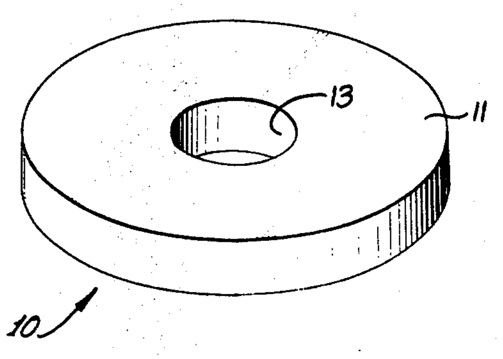
FIG. 1 is an isometric projection of a master member employed in producing the magnetic memory member.

Specific methods of producing magnetic memory members will be described in connection with the production of memory discs. It is to be understood, however, that the invention is also applicable to other forms of memory members, such as rotatable drums. The invention is also specifically directed to a memory disc. Such memory disc may have a magnetic coating on one side or on both sides, as desired.

The steps of producing a magnetic memory disc are illustrated in FIGS. 1 to 12, inclusive. A surface finish control master member 10 is provided in the form of a flat plate having a surface 11 finished to a flatness and smoothness equal or better than the flatness and smoothness required of the magnetic coating of the finished magnetic recording and reproducing disc. This master member is used repeatedly in producing a plurality of discs, and without appreciable deterioration or loss of its flatness and smoothness. It is made of a material compatible with a release agent 12 capable of being wetted by the "mud," or the magnetic plating solution, without permitting the magnetic coating from adhering to the master or release agent in permanent manner. Stainless steel and glass are examples of preferred materials from which the master member 10 can be made. One face 11 of the master member is ground, lapped and polished to an optically smooth and flat surface, the master member having sufficient thickness to assure adequate mechanical strength to withstand the abuse of constant handling, as well as to remain optically flat throughout the process of producing the memory disc. When glass is used, a thickness of about 1 inch is adequate in the repeated production of memory discs 14 inches in diameter. If memory discs having center holes is to be formed, it is convenient but not essential for the master member to also have a center hole 13. This hole facilitates handling of the master member in the cleaning, coating, and elimination of air during the application of the secondary adhesive to he substrate, as described hereinafter.

Figure 2:
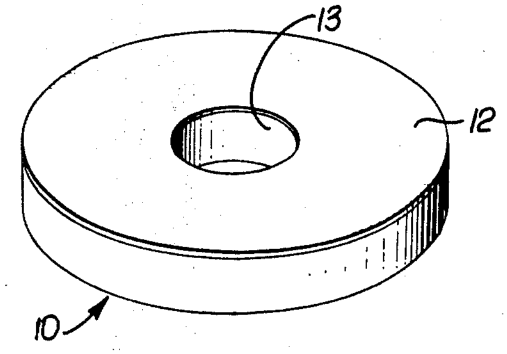
FIG. 2 is an isometric projection of the master member with the parting agent applied to its upper surface.

The master member 10, which, as stated above, may be made of glass or stainless steel, is disclosed in FIG. 1 with an optically flat surface. The parting agent 12 is then applied to this optical surface (FIG. 2). The characteristic of the parting agent and the method of applying it to the optical surface of the master is such as to retain essentially the optical smoothness of the surface 11 after it has been coated with the parting agent.

A number of parting agents have proved satisfactory, including aluminum, silver, or nickel, which are vapor deposited on the master surface. More specifically, a vapor-deposited film of silver, 3 to 5 molecules thick (250 to 500 Angstrom units), has been found adequate to protect the master member from permanent adherence to the magnetic coating. When magnetic discs are made with magnetic coatings of "mud," the "mud" itself forms no part of the present invention, and any suitable type may be used. Specifically, in one form of the invention, an epoxy-type iron oxide mud has been applied to the silver release agent 12 with excellent results.

Figure 3:
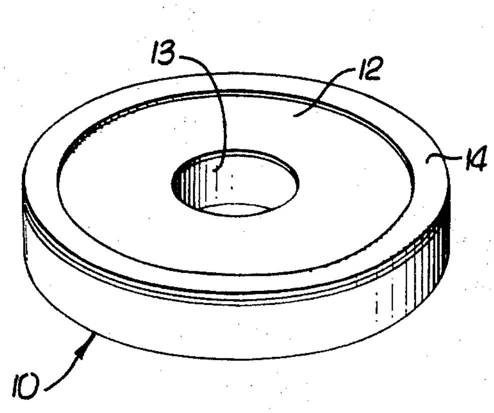
FIG. 3 is an isometric projection of the combination disclosed in FIG. 2, with a ring mask protecting the margin of the parting agent.

After the parting agent has been applied to the master member, an annular mask 14 is placed upon the margin of the parting agent, as disclosed in FIG. 3. This annular or ring mask may be held in place by having a pressure-sensitive adhesive on its inner surface, which will secure and hold it in place during the subsequent application of the mud coating to the parting agent and the mask. In connection with the performance of subsequent operations, it is preferred that the "mud" or coating be absent from the marginal surface of the parting agent 12, in order to secure the desired overall thickness of the finished magnetic disc. The mask 14 may be made of any suitable material, such as paper held in place with pressure-sensitive adhesive, a metal plate held in place during the subsequent coating operation, or small spot masks placed at intervals around the circumference of the parting agent in the precise positions where thickness spacers will later be placed, as described hereinafter in connection with FIGS. 8 and 9. Any other suitable means can be provided for controlling the overall thickness of the finished magnetic disc.

Figure 13:
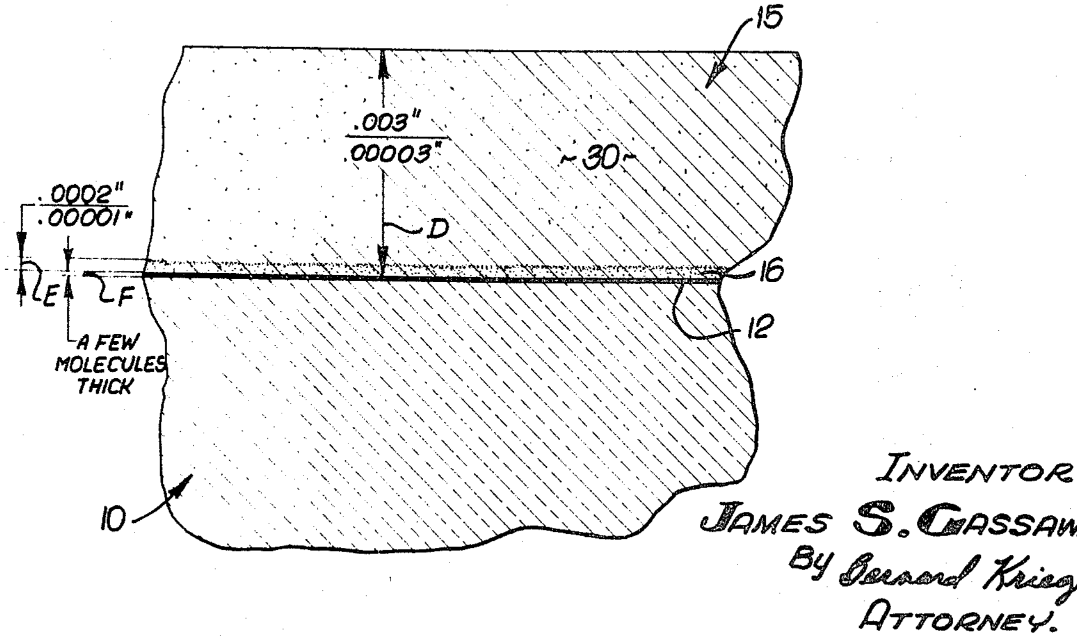
FIG. 13 is an enlarged fragmentary section through the master member, with the parting agent on its optically smooth and flat surface, disclosing the concentration of magnetic particles contiguous the parting agent, and with the binder material forming the balance of the thickness of the initial mixture of magnetic particles and binder of a typical epoxy iron oxide coating.

Following the application of the mask 14 to the parting agent, as illustrated in FIG. 3, the magnetic coating 15 is applied to the parting agent over its entire area, also spreading over the mask. The mud, which, as stated above, may be of the iron oxide epoxy type, may be applied in any suitable manner, as, for example, by spraying or spin coating, until the desired thickness of coating is secured. Actually, the coating is relatively thin, being, for example, of the order of about 0.00003 to 0.003 inches. Since the magnetic iron oxide particles are much heavier than the epoxy resin, they will tend to gravitate or shift downwardly through the epoxy resin and produce a concentration of oxides 16 in the coating at the bottom thereof and contiguous the parting agent 12 (FIG. 13). In lieu of more gravitational effects in securing the concentration of oxides at the lower portion of the mud 15, such concentration may be assisted by other means, as, for example, by vibrating the master 10 to secure a downward settling of the magnetic particles adjacent to the parting agent 12, which, as stated above, has a thickness of about 3 to 5 molecules or 250 to 500 Angstrom units.

Figure 4:
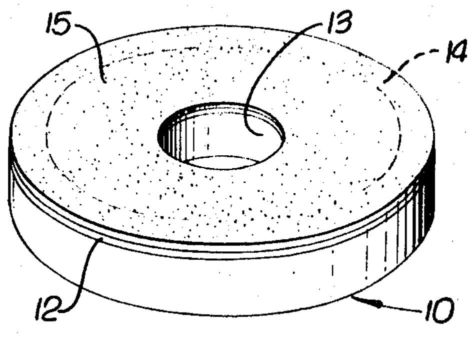
FIG. 4 is a view similar to FIG. 3, with the magnetic coating applied to the parting agent and the ring mask.
Figure 5:
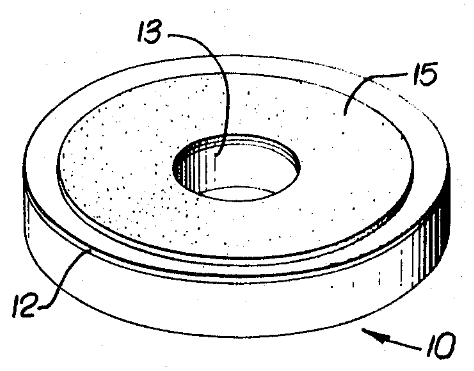
FIG. 5 is a view similar to FIG. 4, with the mask removed.
Figure 8:
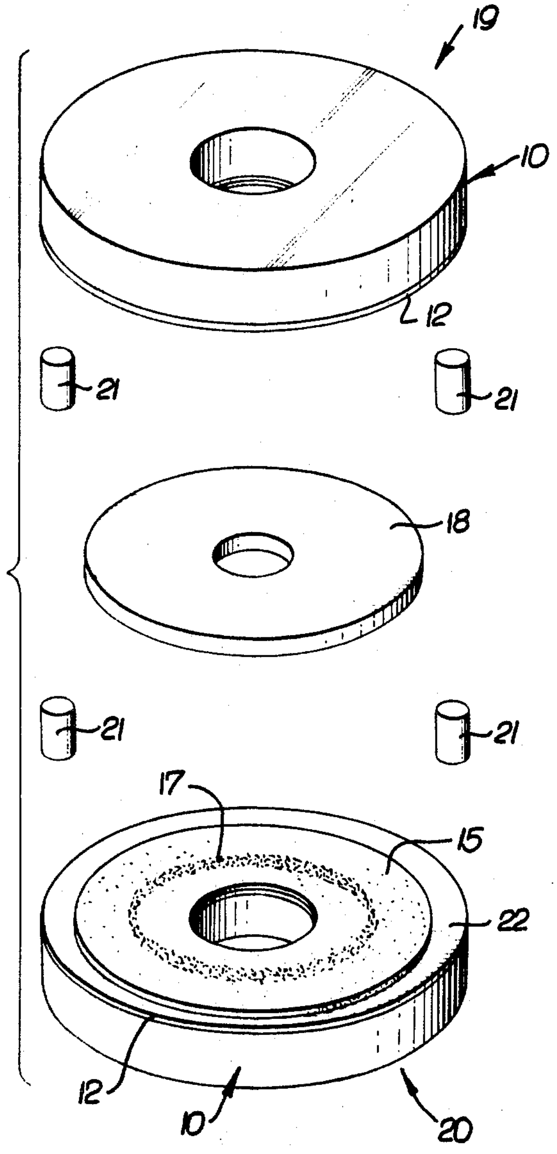
FIG. 8 is an exploded view of an upper master assembly and a lower master assembly, each in the condition disclosed in FIG. 6, with an intervening disc or substrate and spacers.
Figure 6:
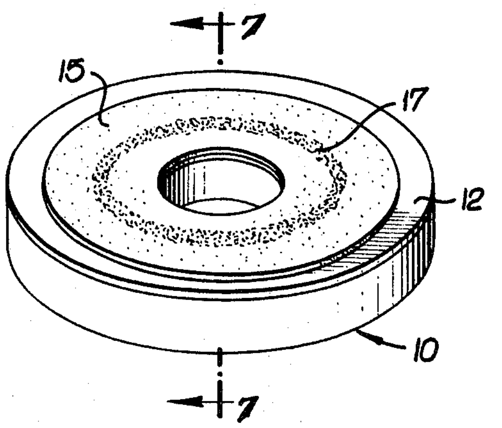
FIG. 6 is a view similar to FIG. 5, with the secondary adhesive applied in annular fashion to the partially cured magnetic coating.
Figure 7:
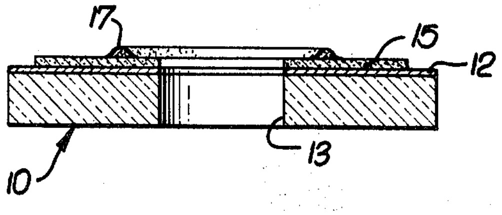
FIG. 7 is a cross section taken along the line 7—7 on FIG. 6.

The combination disclosed in FIG. 4, in which the mud has been applied to the parting agent, is then heated for the purpose of partially curing the mud-type coating 15 to a hardened state. As an example, the combination can be heated at temperatures between about 90° F. to about 125° F. for about 10 to 30 minutes for the purpose of accelerating the hardening action of the coating 15. The curing need only be sufficient so that the coating will not flow when reheated, as in connection with curing a secondary adhesive, as described hereinbelow. The ring mask 14 can then be removed, the resulting combination then appearing in the form disclosed in FIG. 5.

A secondary adhesive of a suitable bonding material is then applied to the magnetic coating 15. As disclosed in FIGS. 6 and 7, the secondary adhesive 17, which may also be an epoxy resin, is placed on the surface of the coating, as in an annular form. A substrate 18 is then to be placed against this secondary adhesive 17, causing the latter to spread out over the entire area of the surface of the magnetic oxide coating 15. In the subsequent description of the method of making the finished magnetic memory disc, both sides of the disc 18 are magnetically coated. For that reason, an upper master assembly 19 and a lower master assembly 20 are provided, each of which is as disclosed in FIGS. 6 and 7, both of which have the secondary adhesive 17 on their magnetic coated surface. The disc or substrate 18 is placed between the upper and lower master assemblies 19, 20, as illustrated in the exploded view shown in FIG. 8, the upper assembly being inverted. The disc 18 is of a diameter less than the diameter of the magnetic coating 15 on each master assembly, so that the periphery of the disc will not extend laterally beyond the magnetic coating. Thickness spacers 21 are placed at intervals around the uncoated margin 22 of the parting agent 12 of the lower assembly 20, the disc then being placed against the secondary adhesive 17 of the lower assembly, and the inverted upper assembly 19 then placed upon the upper surface of the substrate, with the spacers 21 contacting the uncoated margin of its parting agent 12. The master assemblies 19, 20 are forced toward one another, causing the secondary adhesive or epoxy resins 17 to spread out over the surfaces of the magnetic coatings 15 both in inward and outward directions, driving out the air between the surfaces. The extent to which the several members can be pressed together is limited by the engagement of the thickness spacers 21 with the uncoated surfaces 22 of the silver or other parting agents on the upper and lower master members 10 (FIG. 9).

Figure 9:
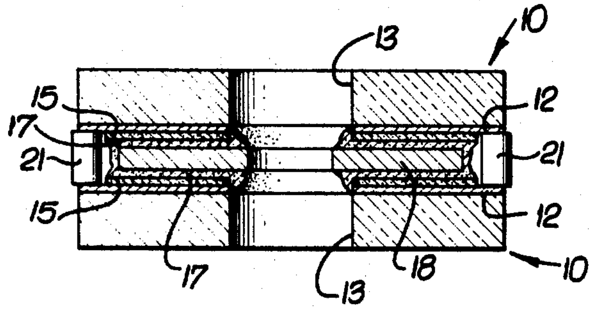
FIG. 9 is a vertical section through the upper and lower assemblies pressed into engagement with the intervening disc or substrate, and with spacers holding the upper and lower assemblies in appropriate spaced relation from one another.

Heat is then applied to the "sandwich" disclosed in FIG. 9, to cure the secondary epoxy resin 17, or other adhesive employed, and to finish cure the magnetic coatings 15. As an example, heat can be applied for about 10 to 30 minutes at temperatures ranging from 150° F. to 300° F., such heat causing expansion of the several components of the sandwich. Assuming the substrate 18 to be an aluminum disc, it will expand more than the upper and lower master members 10. Accordingly, when heating is discontinued and the sandwich cools, the relatively strong substrate 18 and master members 10 contract in proportion to their respective different coefficients of thermal expansion, the resulting internal stresses causing the sandwich to be separated into three main separate portions A, B, C, illustrated in FIG. 10. The separations take place in the plane of the two weak bonds, namely, between the parting agents 12 and their associated master members 10, to which the parting agents are loosely bonded. As a result of the curing by the application of heat, the substrate 18 is tightly bonded to each secondary binder 17, which, in turn, is tightly bonded to its adjacent magnetic coating 15, such magnetic coating being tightly bonded to its parting agents 12.

Figure 10:
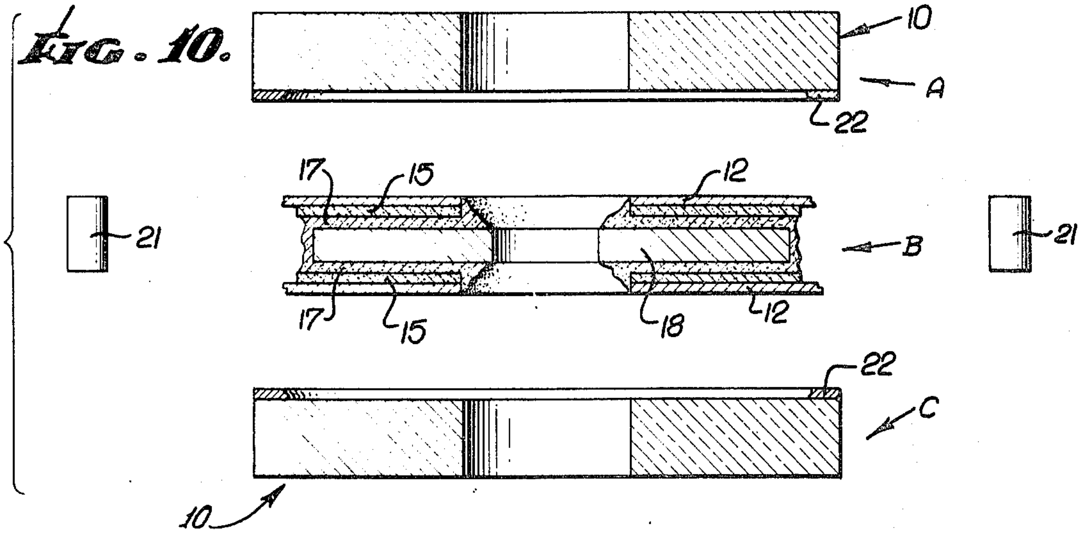
FIG. 10 is an exploded view of the separating action of the combination disclosed in FIG. 9 as a result of cooling the assembly and after curing of the secondary adhesives.
Figure 11:
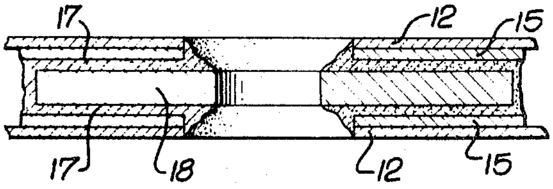
FIG. 11 is a view of the disc assembly only disclosed in FIG. 10, with the parting agents still applied to the magnetic coatings located at opposite sides of the substrate.
Figure 12:
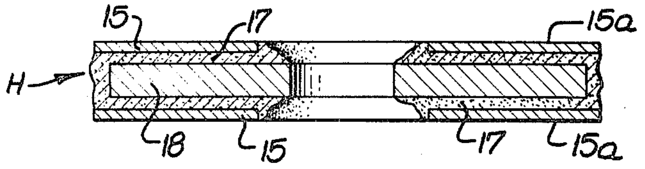
FIG. 12 is a view similar to FIG. 11 of the finished memory disc, with the parting agents removed.

As illustrated in FIG. 10, the spacers 21 have been removed and the outer margin 22 of each silver or other parting agent 12 remain adherent to its associated master 10, the other portions being tightly bonded to one another, as explained above and as disclosed at B, and also in FIG. 11. During the pressing operation of the master assemblies 19, 20 toward each other and against the intervening substrate 18, the secondary binder material 17 will be forced inwardly within the central openings in the magnetic coating and parting agents 12, and also outwardly and around the perimeter of the disc or substrate 18, as disclosed in FIGS. 9 to 12.

At the present time, it is not customary for recording and reproducing discs to have coatings of metals remain over iron oxide epoxy surfaces. This coating 12 may be removed by dipping the memory disc into a dilute acid for a few seconds and then rinsing it in water, the final memory member being illustrated in FIG. 12. If the silver or other metallic coatings 12 were permitted to remain on the surfaces of the magnetic coatings 15, they would afford protection to the recorded information in the magnetic surfaces against inadvertent contact with other members, such as with the recording or reproducing head of the computer mechanism.

It will be appreciated that the thicknesses of parting agent 12, mud 15, and secondary adhesive 17 are quite small, and that the proportions disclosed in the drawings have been greatly exaggerated for purposes of illustration. As an example, a magnetic coating or mud 15 may be in the range of 0.00003 inches to 0.003 inches, the concentrated oxide 16 adjacent to the silver parting agent 12 ranging from about 0.00001 to about 0.0002 inches, the silver coating 12, as stated above, ranging in thickness from about 250 to 500 Angstrom units.

The greatly enlarged section of FIG. 13 is intended to indicate to a better extent the relative thickness of the components just referred to. The magnetic coating 15 has the thickness D, and since the oxides in this coating have gravitated or otherwise been caused to concentrate at the outer surface of the coating adjacent to the silver or other parting agent 12, they are of much lesser thickness, being designated by the letter E. The silver parting agent 12 itself is so small in thickness as to be virtually incapable of representation of the drawing, being disclosed in somewhat exaggerated form in FIG. 13 as having the thickness F.

The completed recording disc H (FIG. 12) requires no subsequent operation on its magnetic coatings 15 after removal of the parting agents 12, assuming the parting agents are removed. No subsequent mechanical finishing operation is required, such as lapping and polishing usually required in the prior art. This is due to the fact that the outer surfaces 15*a* of the disc have the smoothness and flatness of the surface 11 of each master member 10, and such smoothness and flatness remain unimpaired during the several operations required for the production of the recording disc. The smoothness and flatness of the surfaces 15*a* are independent of the condition of the substrate or aluminum disc 18, which may even have imperfections in it, but such imperfections are filled by the secondary epoxy 17, or other adhesive, that is employed. The magnetic particles 16 themselves are concentrated at the outer surface of the magnetic coating, and not at the surface of the substrate 18, so that they do not follow the contour of the latter. With the process presently described, substrates can be used having finishes even rougher than commercially available discs or blanks now supplied to the industry. No preliminary surface finishing is required for their use. In fact, it is possible to use various substrate materials that do not have smooth surfaces, as, for example, forming the substrate of a material such as an epoxy-impregnated fiber glass cloth or matting. The secondary epoxy 17, or other binder, will fill the imperfections in the substrate, as has been noted above. Aluminum has been specifically referred to as a substrate, since this is the material widely used in the computer industry. Any suitable substrate material can be used, and in fact, the above-cited example of an epoxy impregnated fiber glass cloth is proposed for use since the epoxy binders therein can be cured during the curing of the secondary binder or epoxy in producing the memory disc.

In prior memory discs, the iron oxides and other solids, which are the magnetic part of the coating, drop out of suspension and deposit more densely next to the substrate 18, leaving a less dense nonmagnetic epoxy, or other coating material, in close proximity to the recording surface of the disc. Because of this factor, the thickness of the substrate essentially controls the thickness of the completed disc. By virtue of the present invention, the thickness of the completed disc is independent of the substrate thickness, since the iron oxides and other magnetic solids also drop out of suspension, but deposit more densely adjacent the parting agent 12 on the master member 10 (FIG. 13), leaving the less dense nonmagnetic epoxy 30, or other binder material, possessed of a minimum of iron oxides, and the like, which extend from the concentrated magnetic film 16 toward the substrate 18. As a result of the present method of making the recording disc, a much thinner magnetic coating 16 of higher density solids are produced near the recording surface, as distinguished from the prior recording disc in which the concentration of the magnetic solids is adjacent the substrate 18.

With applicant's recording disc, the mud thickness D presented in FIG. 13 of as much as 0.003 inches is over 10 times thicker than the thickness presently considered good practice with prior recording discs. Such much greater thickness has no effect whatsoever on the superiority of the present recording disc, since the magnetic film 16 is still concentrated at the outer or recording surface of the coating 15. Since the magnetic solids are caused to concentrate at the outer surface of the coating, as by the action of gravity, vibration, centrifugal force, or magnetism, a low viscosity epoxy 30, or other binder material, comingled, if desired, with a volatile thinning agent, can be employed to enhance the dropping out of the dispersion of the magnetic materials to form the dense magnetic film 16 in intimate contact with the parting agent 12. Regardless of the thickness D of the overall magnetic coating 15, this dense magnetic film 16 can be of the order of 0.00003 inches in thickness, and even much less, which is about one-sixth of the prior best practice in the industry. The thinner the effective magnetic layer 16, the higher is the packing density or bits per inch of such layer.

In another specific embodiment of the invention, it is unnecessary to apply the parting agent 12 to the master member 10 preparatory to the application of the mud 15. A small quantity of a suitable lubricant, such as carnauba wax or a silicone, can be mixed with the iron oxide epoxy-type mud, which for example, may be in the order of magnitude of one part of lubricant to a thousand parts of mud, such quantity of lubricant being sufficient to prevent adhesion of the mud to the surface 11 of the master member. The memory member can be produced in the same manner as described in connection with FIGS. 1 to 13, inclusive, except that the application of a parting agent to the surface of the master member is omitted.

Another embodiment of the invention involves the use of plated magnetic materials as the magnetic coating 15 on the disc surface, instead of using the iron oxide epoxy-type mud, as specifically described above in connection with FIGS. 1 to 13, inclusive. The master member 10 is made to the desired smoothness and a conductive parting agent 12, such as silver, is applied to its surface 11, such parting agent being applied in the same manner as described in connection with FIG. 2. The ring mask 14 is then placed on the master member and against the parting agent 12, as disclosed in FIG. 3, and magnetic material 15, for example, nickel cobalt, plated against the parting agent within the confines of the ring mask. No curing is required for the nickel cobalt material 15. The remainder of the method or process of producing a disc with plated magnetic material as the magnetic coating thereon is the same as described above in connection with FIGS. 4 to 12, inclusive; that is, the ring mask 14 is removed, as disclosed in FIG. 5; and the secondary epoxy adhesive 17 is applied to the magnetic material, as disclosed in FIGS. 6 and 7. If a memory disc coated on both sides is to be made, an upper master assembly 19 and a lower master assembly 20 are provided with the disc or substrate 18 therebetween, as disclosed in FIG. 8, the assembly being pressed together with the intervening thickness spacers 21 engaging the uncoated margins of the parting agents to provide the sandwich disclosed in FIG. 9, after which such combination is cured to harden the epoxy resin 17, and the sandwich cooled, causing separation of the sandwich, as shown in FIG. 10, the upper and lower master members 10 and the spacers 21 being removed, resulting in the sandwich disclosed in FIG. 11, after which the parting agents (silver coatings) are removed to produce the finished product disclosed in FIG. 12, except, of course, that the magnetic coatings 15 are plated instead of being in the form of cured iron oxide epoxy-type mud.

In prior art devices, when plated magnetic material has been applied directly on the surface of a disc or substrate 18, undesired pimples or high spots are produced, which are usually considered as being caused by impurities. Such pimples or high spots cause difficulties, since they are on the surface used for writing and reading. In the embodiment of the present invention in which plated magnetic material on the disc surface or surfaces is used as a magnetic coating or coatings, any pimples or high spots formed on the plated surface are covered by the secondary epoxy 17, and, if they are not overly large, can be ignored since they will not interfere with the flying of the computer head over the opposite surface of the plated material, which is the surface formed by the surface 11 of the master member 10 or of the parting agent 12 thereon. Thus, a memory member using plated magnetic materials, such as nickel cobalt, is provided in which no subsequent operations are needed to improve the condition of the exposed surface and which plated surface is virtually independent of the condition of the substrate 18, inasmuch as the intervening secondary epoxy 17 will serve as an appropriate filler between the plated magnetic material and the substrate, in addition to firmly adhering the plated material to the substrate.

The plated magnetic material can be applied directly to the surface of the master member without the necessity of using a conductive parting agent, such as silver 12, through the employment of the electroless process, since electroless materials will plate out on almost any material, and such material need not be conductive, as in the case of the several parting agents 12. The same problems are overcome of pimples or high spots being formed on the surface of the electroless plating, and the same advantages and results are achieved with the present method of producing the magnetic memory members, since the pimples or high spots will still be embedded in the secondary epoxy resin 17, instead of being exposed to the flying read-write head.

In connection with the production of memory discs having plated magnetic materials as the magnetic coatings, a foil can be applied against the master member in place of the silver parting agent 12, such foil, which may be gold foil, having the proper thickness. The remainder of the process described above in connection with the use of the silver parting agent would then be followed to produce the disc. The gold foil is of very low thickness, corresponding to the particular values given above for the silver parting agent, resulting in the master surface 11 producing a corresponding surface on the magnetic coating, the parting agent being so thin as not to materially deteriorate the surface smoothness of the master member, which is duplicated on the magnetic material 15. Despite its thinness, the parting agent should yet be thick enough to avoid the presence of holes between its molecules, thereby preventing the magnetic coating 15 from coming in contact with the master member.

Where a plated magnetic material is employed as the magnetic coating on a disc surface, it is considerably thinner than oxide coatings, being in the order of magnitude of from about 0.000005 to about 0.000025 inches in thickness.

It is thus apparent that a method or process of producing magnetic memory members has been provided, as well as an improved magnetic memory member itself, in which the production of the finished product is not dependent upon the surface of the substrate for the control of the thickness of the disc and the thickness and smoothness of the surface of the coating or mud. The master member is reuseable for the making of a plurality of recording discs, since the optical quality of its surface 11 remains unimpaired. Instead of the requirement for very accurate surface finishing the substrate, as in prior devices, it is only the master surface which need be finished to its optical smoothness and flatness a single time. The natural precipitating tendencies of the oxides of the mud coatings to produce thinner, flatter and smoother magnetic coatings, and uniform thickness of discs, is independent of the surface finish of the substrate and its thickness. By eliminating the surface preparation of the substrate, and the need for their lapping and polishing of the recording surfaces, the production of defective recording discs and material are reduced, the resulting manufacturing cost also being reduced to a substantial extent. Substantial reductions in manufacturing costs are, in fact, produced regardless of the factor of rejecting unsatisfactory discs, resulting from the use of prior processes.

The specific discs illustrated in the drawings and described above each has the magnetic recording surface applied to both sides of the substrate. It is to be understood, however, that, if desired, only a single master member 10, parting agent 12, mud or plated coating, and secondary adhesive 17 can be used in providing a magnetic coating 15 to only one side of the disc or substrate 18.

I claim:

1. The method of making a magnetic memory member comprising providing a rigid master member having a nonundulant surface thereon corresponding to the desired surface of the memory member, applying a coating to said master member surface comprising magnetic memory means, bonding said coating to a substantially rigid substrate, and then releasing said coating from said master member.

2. A method as defined in claim 1; said coating being bonded to said substrate by applying an intervening bonding agent to said coating and substrate.

3. A method as defined in claim 1; wherein said surface is smooth and flat and said substrate is of disc form to produce a disc magnetic memory member.

4. A method as defined in claim 1; wherein said substrate and master member are made of materials having different coefficients of expansion, the temperature of said substrate and master member being changed to release said coating from said master member without effecting release of said coating from said substrate.

5. A method as defined in claim 1; wherein said coating comprises a parting agent applied to said surface, said magnetic memory means being applied to said parting agent.

6. A method as defined in claim 1; wherein said coating further comprises a minor amount of a lubricant to permit releasable contact of said coating against said surface.

7. A method as defined in claim 1; wherein said magnetic memory means is a magnetic plating.

8. A method as defined in claim 1; wherein said magnetic memory means is a magnetic plating; said coating being bonded to said substrate by applying an intervening bonding agent directly to said magnetic plating and substrate.

9. A method of making a magnetic memory member comprising providing two rigid master members, each having a nonundulant surface corresponding to a desired surface of said memory member, applying a coating comprising magnetic memory means to the surface of each master member, placing a rigid substrate between the opposed coated surfaces of said master members, bonding said coatings to opposite sides of said substrate, and then releasing said coatings from said master members.

10. A method as defined in claim 9; wherein said magnetic memory means of each coating is a magnetic plating.

11. A method as defined in claim 9; each of said coatings being bonded to said substrate by applying an intervening hardenable bonding agent to said coating and substrate.

12. The method of making a magnetic memory member comprising providing a rigid master member having a nonundulant surface thereon corresponding to the desired surface of the memory member, applying a coating comprising a dispersion including magnetic particles to said surface, placing rigid substrate against said coating, hardening said coating and bonding said coating to said substrate, and then releasing said hardened coating from said surface of said master member.

13. A method as defined in claim 12; wherein said surface is smooth and flat and said substrate is of disc form to produce a disc magnetic memory member.

14. A method as defined in claim 12; wherein said dispersion includes a mixture of magnetic particles and a binder, said dispersion being hardened and bonded to said substrate by heating said dispersion.

15. A method as defined in claim 12; wherein said dispersion includes a mixture of magnetic particles and a binder, said dispersion being hardened and bonded to said substrate by heating said coating, substrate and master member, said master member and substrate having different coefficients of expansion, whereby cooling of said hardened coating, substrate and master member releases said master member from said coating without releasing said dispersion from said substrate.

16. A method as defined in claim 12; wherein said magnetic particles are concentrated in said dispersion contiguous said surface preparatory to hardening of said dispersion.

17. A method as defined in claim 12; wherein said surface is smooth and flat, said substrate being of disc form to produce a disc magnetic memory member, said master member being below said coating to permit said magnetic particles to gravitate in said dispersion toward said surface to provide a concentration of particles contiguous said surface preparatory to hardening of said dispersion.

18. A method of making a magnetic memory member comprising providing a rigid master member having a nonundulant surface thereon corresponding to the desired surface of the memory member, depositing a parting agent on said surface, coating said parting agent with a mixture of magnetic particles and a binder, placing a rigid substrate against said mixture, hardening said mixture and bonding said mixture to said substrate, and then releasing said parting agent from said master member surface.

19. A method as defined in claim 18; wherein said surface is smooth and flat and said substrate is of disc form to produce a disc magnetic memory member.

20. A method as defined in claim 18; wherein said mixture is hardened and bonded to said substrate by heating said mixture, substrate, parting agent and master member, said master member and substrate having different coefficients of expansion whereby cooling of said hardened mixture, substrate, parting agent and master member releases said parting agent from said master member surface.

21. A method of making a magnetic memory member comprising providing two master members, each having a surface thereon corresponding to a desired surface of said memory member, applying a coating comprising a dispersion including magnetic particles to the surface of each master member, placing substrate between the opposed coated surfaces of said master members, retaining said opposed surfaces a predetermined distance apart, hardening said dispersions and bonding said dispersions to the opposite sides of said substrate, and then releasing said master members from said coatings.

22. A method as defined in claim 21; at least partially hardening said dispersions preparatory to placing said substrate between the opposed coated surfaces of said master members, applying a binder to each of said at least partially hardened dispersions, then placing the substrate between the opposed coated surfaces of said master members with said binders being bonded to the opposite sides of said substrate.

23. A method of making a magnetic memory member comprising providing two master members, each having a surface thereon corresponding to a desired surface of said memory member, depositing a parting agent on said surface of each of said master members, coating each parting agent with a mixture of magnetic particles and a binder, placing a substrate between the opposed coated surfaces of said master members, placing spacer means between said master members in engagement with uncoated areas of said parting agent to determine the overall thickness of said memory member, hardening said mixtures and bonding said coatings to the opposite sides of said substrate, and then releasing said master member surfaces from said parting agents.

24. The method of making a magnetic memory member comprising providing a rigid master member having a nonundulant surface thereon corresponding to the desired surface of the memory member, applying a coating comprising magnetic material to said master member surface, applying an intervening fluent bonding agent to said coating and to the surface of a substantially rigid substrate, whereby hardening of said bonding agent firmly secures said coating to said substrate, and releasing said coating from said master member after said bonding agent has substantially hardened.

25. A method as defined in claim 24; wherein said bonding agent is a heat-hardenable synthetic resin.

26. A method as defined in claim 24; wherein said bonding agent is an epoxy resin.

27. A method as defined in claim 24; wherein said bonding agent comprises a nonmagnetic and electrically insulating material.

28. A method as defined in claim 24; wherein said coating applied to said master member surface comprises a mixture of magnetic particles and a binder therefor, said bonding agent being applied directly to said mixture and said surface of said substrate.

29. A method as defined in claim 24; wherein said coating applied to said master member surface comprises a mixture of magnetic particles and a binder therefor, said bonding agent being applied directly to said mixture and said surface of said substrate; said bonding agent comprising a nonmagnetic and electrically insulating material.

30. A method as defined in claim 24; wherein said coating applied to said master member surface comprises a magnetic plating, said bonding agent being applied directly to said plating and said surface of said substrate.

31. A method as defined in claim 24; wherein said coating applied to said master member surface comprises a magnetic plating, said bonding agent being applied directly to said plating and said surface of said substrate; said bonding agent comprising a nonmagnetic and electrically insulating material.

PO-1050
(5/69)

UNITED STATES PATENT OFFICE
CERTIFICATE OF CORRECTION

Patent No. 3,607,528 Dated September 21, 1971

Inventor(s) JAMES S. GASSAWAY

It is certified that error appears in the above-identified patent and that said Letters Patent are hereby corrected as shown below:

Column 10, line 50, before "rigid" insert --a--.

Column 11, line 30, before "substrate" insert --a--.

Signed and sealed this 29th day of February 1972.

(SEAL)
Attest:

EDWARD M.FLETCHER,JR.
Attesting Officer

ROBERT GOTTSCHALK
Commissioner of Patents